United States Patent [19]

Vogelenzang

[11] 4,034,541
[45] July 12, 1977

[54] KNIFE OR FLAIL ATTACHMENT FOR FLAIL TYPE HARVESTER

[76] Inventor: Alexander Jan Vogelenzang, Wageningsestraat 28, Andelst, Netherlands

[21] Appl. No.: 663,536

[22] Filed: Mar. 3, 1976

[30] Foreign Application Priority Data

Mar. 5, 1975  Netherlands .................. 7502630

[51] Int. Cl.² ........................................ A01D 55/22
[52] U.S. Cl. .................................................. 56/294
[58] Field of Search .......... 56/294, 12.7, 400, 289, 56/504, 505

[56] References Cited

U.S. PATENT DOCUMENTS

| | | |
|---|---|---|
| 2,711,067 | 6/1955 | Mott .............................. 56/12.7 X |
| 2,923,117 | 2/1960 | Henderson ....................... 56/294 |
| 3,171,243 | 3/1965 | Johnston .......................... 56/400 |
| 3,411,279 | 11/1968 | Panek et al. ..................... 56/294 |

FOREIGN PATENT DOCUMENTS 100,454  11/1964  Denmark ...................... 56/294

*Primary Examiner*—Jay N. Eskovitz
*Attorney, Agent, or Firm*—James E. Nilles

[57] ABSTRACT

A knife or flail attachment for the use on flail type harvesters that enables quick and easy changes of the flails and/or the flail attachment. The attachment having bolts for coupling each one or two knives or flails, each bolt passes diametrically through the shaft and has a threaded end portion, at least one end of said bolt carrying a hook, the end of which engages in a recess formed at the periphery of the shaft.

6 Claims, 2 Drawing Figures

KNIFE OR FLAIL ATTACHMENT FOR FLAIL TYPE HARVESTER

BACKGROUND OF THE INVENTION

1. Field of the Invention

The invention relates to a knife or flail attachment for a flail type harvester that is adapted for use at a circular rotor shaft and that enables changes of the flails and/or the flail attachment without special tools.

To permit clearance from ground obstacles the flails should be pivotally attached nearest to the periphery of the rotor shaft and should be formed as to contact the outer surface of the shaft with most of its length.

2. Description of the Prior Art

In United Kingdom Patent No. 1,144,611 — BOMFORD & EVERSHED LIMITED, the coupling element is a U-shaped clamp comprising two parallel spaced limbs of different length, the free ends of which are adapted to enter two of the holes in the rotor shaft, and means for releasably retaining said limbs in said holes. The cross-section of the tubular shaft is of square configuration. Two opposite walls of the shaft are drilled to provide registering holes and one of the walls is provided with a hole spaced from the other holes. The longer limb is passed through the registering holes and the shorter limb extends through the spaced hole and terminates within the tubular shaft in abutment with the inner face thereof. The end of the longer limb is bent over in an opposite direction of rotation of the shaft. The clamp-like bridging piece connecting the two limbs receives a chain, at the end of which the flail is fastened.

It is hardly practicable to provide holes for such coupling elements when rotor shafts of cylindrical cross-section are used, as the boring tool has to be applied at the shaft surface at an inclined angle passing through the shaft at a radial distance from the center line. As a heavy risk it must be considered that the boring tool is drifted away from the predetermined position at the outer and the opposite inner face of the cylindrical rotor shaft wall. Moreover, the second hole for the second limb of the pre-known structure requires a further working process.

If replacement of the flail or the flail-carrying chain is necessary after damage, the longer limb must be re-straightened to permit the pre-known coupling element to be drawn from the shaft. This, however, requires a special tool which is mainly unavailable in the field.

In the U.S. Pat. No. 3,765,158 — MOTT, the coupling element comprises a pin extending diametrically through a rotor shaft of circular cross-section for pivotal receiving arms in the form of a yoke ambracing the rotor shaft. Replacement after the damage of said arms or of the flails secured to it, requires a special tool, as well.

SUMMARY OF THE INVENTION

Accordingly, it is the primary object of this invention to provide a knife or flail attachment at circular rotor shafts of flail type harvesters to enable the flails easily to be assembled and to be replaced after damage of flails and/or flail attachment without use of special tools.

A further object of the invention is to provide a knife or flail attachment which has a small radial protrusion of the rotor shaft, in order to permit clearance from obstacles. Due to this the flails should have a special shape.

The present invention is a coupling element for the flail attachment arranged as a bolt, passing diametrically through a circular rotor shaft, and having a threaded end portion, at least one end of said bolt carrying a hook with its open portion faced to the periphery of the rotor shaft, the hook end engages in a recess formed at the periphery of the rotor shaft.

A bolt passing diametrically through the shaft requires only a single hole through the shaft which crosses the center line of the shaft. Thus, a bore tool cannot drift away from a diameter through the shaft.

At the outer surface of the shaft such a coupling element protrudes in asmuch as the hook is bent outwardly.

With its end engaging in a recess of the rotor shaft the hook constitutes a closed opening adjoining the outer surface of the shaft, in which the knife or flail can be moved towards said surface after striking an obstacle. To permit the knife or flail to come free from an obstacle more easily and to contact the periphery of the shaft when stroked by an obstacle, the knife or flail is curved with a radius of curvature corresponding to the radius of the shaft.

According to the desired number or closeness of the knives or flails the bolts passing through the shaft can be formed as hook bolts or as screw bolts. At one or each end of a screw bolt a hook can be provided.

DESCRIPTION OF THE DRAWINGS

Other objects of the invention will become apparent upon referring to the accompanying drawings which are illustrative of the invention.

DETAILED DESCRIPTION OF THE DRAWINGS

Figure 1:
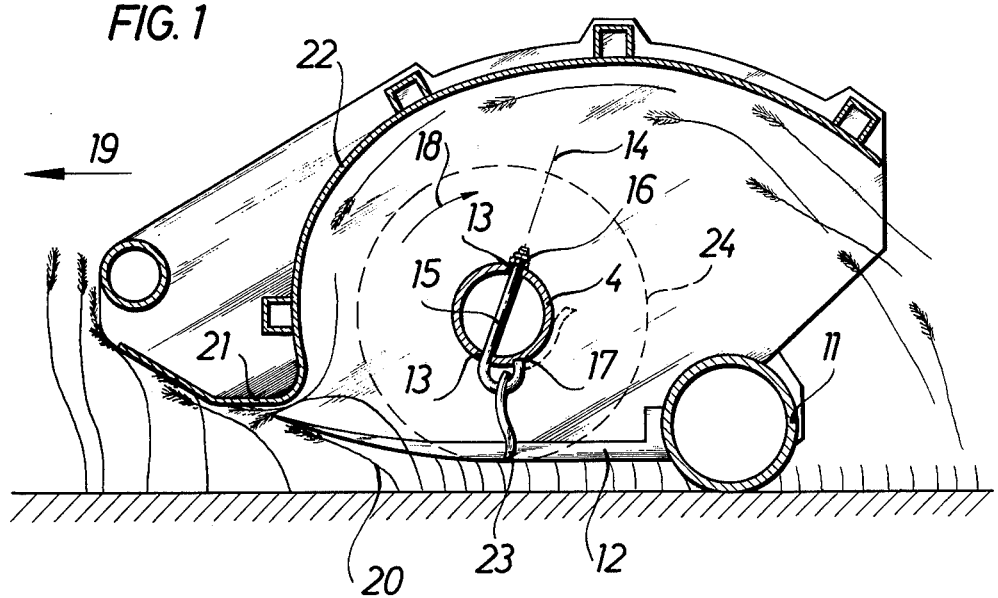
FIG. 1 is a longitudinal vertical section through the center of the flail type harvester having a hook bolt as flail connecting means.

Referring now to the drawings by numerals of reference, and at first to FIG. 1, there is shown a flail type harvester which comprises ground wheels 11, a lower frame structure 12 mounted thereon and being vertically adjustable, a crop deflecting plate 21, a hood 22 over the flail unit and a hollow rotor shaft 4 extending transversely to the direction of movement 19. As shown at 20 in FIG. 1, the crop deflecting plate 21 deflects the crop in travel direction so that the crop is bent nearly tangentially at the circle 24 which is shown in dotted lines in FIG. 1 and is described by the ends of the radially extending knives or flails 23 under rotation of the rotor shaft 4 in the direction of the arrow 18.

As shown in FIG. 1 each knife or flail 23 is mounted at the periphery of the rotor shaft by means of a hook bolt 15 passing through two apertures 13 which are diametrically opposite arranged in the hollow shaft wall in the axis of symmetry 14 of said shaft. A hook is formed at one end of said hook bolt 15 with its open portion towards the periphery of the shaft 4 for pivotal receiving of the knife or flail 23. The hook engages a recess 17, formed as a groove notch or blind bore at the periphery of the shaft for retaining the hook bolt against rotation and distortion. In axial extension the hook bolt is secured within the hollow shaft 4 by a nut 16 provided at a threaded part of the projecting end of the bolt opposite to the hook. This nut 16 is prestressed so that the hook end securely engages the recess 17.

Figure 2:
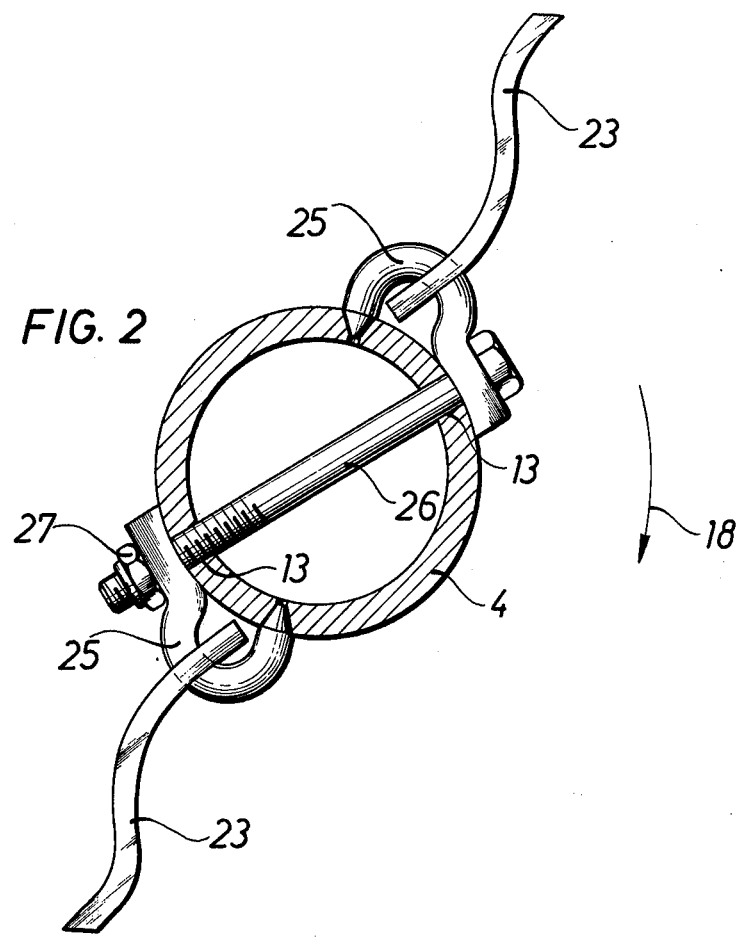
FIG. 2 is a section through the rotor shaft having a screw bolt for connection two diametrically opposite connected flails.

As shown in FIG. 2 the bolt passing through the apertures 13 is formed as a screw bolt 26 having a threaded portion at one end and carrying a hook 25 at each end. Each hook 25 has a flange with an aperture for receiving the screw bolt 26 with an inner surface adapted to the diameter of the shaft 4. The one hook is kept against the periphery of the shaft by the bolt head and the diametrically opposed hook is kept by a nut 27 secured to the threaded portion of the screw bolt. For each hook end a recess is provided.

The knives or flails 23 are curved with a radius of curvature corresponding to the radius of the shaft 4. This permits the flail to come free from an obstacle more easily and to contact the periphery of the shaft 4 with its concave side.

I claim:
1. In a flail type harvester:
a horizontally extending rotor shaft having a connection hole extending inwardly from the periphery of said rotor shaft, said shaft further having a recess therein;
a flail having a hole therethrough;
and coupling means for connecting said flail to said rotor shaft, said coupling means comprising a bolt portion having a threaded portion at one end and extending through said connection hole in said rotor shaft, means for securing said bolt portion to said rotor shaft, and said coupling means further comprising a clamp portion including a hook connected to said bolt portion, said hook having its open portion facing the periphery of said rotor shaft and extending through said hole in said flail for pivotally receiving said flail thereon, said hook having an end which engages said recess on said rotor shaft.

2. A flail type harvester according to claim 1 in which said bolt portion has said hook integrally formed at one end thereof, and wherein said threaded portion of said bolt portion is secured with a nut to the periphery of the rotor shaft.

3. A flail type harvester according to claim 1 in which said bolt portion comprises a screw bolt connected to said hook, said clamp portion comprising a bored flange fixed to said hook, said bored flange being pressed against the outer surface of said rotor shaft by means secured to an end of said screw bolt.

4. A flail type harvester according to claim 1 in which said rotor shaft is a hollow section shaft.

5. A flail type harvester according to claim 1 in which said flail is curved with a radius of curvature corresponding to the radius of said shaft whereby said flail can be against said rotor shaft.

6. A flail type harvester according to claim 3 in which the face of said bored flange adjoining said outer surface of the rotor shaft is curved with a radius of curvature corresponding to the radius of the shaft.

* * * * *